US012665526B2

(12) United States Patent
Lee et al.

(10) Patent No.: US 12,665,526 B2
(45) Date of Patent: Jun. 23, 2026

(54) WIRED VIBRATION ENERGY TRANSFER SYSTEM AND METHOD

(71) Applicant: Toyota Motor Engineering & Manufacturing North America, Inc., Plano, TX (US)

(72) Inventors: Taehwa Lee, Ann Arbor, MI (US); Xiaopeng Li, Ann Arbor, MI (US); Ziqi Yu, Ann Arbor, MI (US); Yukihiro Tadokoro, Ann Arbor, MI (US); Danil Prokhorov, Canton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 807 days.

(21) Appl. No.: 18/166,224

(22) Filed: Feb. 8, 2023

(65) Prior Publication Data

US 2024/0266975 A1 Aug. 8, 2024

(51) Int. Cl.
*H02N 2/18* (2006.01)
*H02K 7/18* (2006.01)

(52) U.S. Cl.
CPC ........... *H02N 2/186* (2013.01); *H02K 7/1807* (2013.01); *H02N 2/181* (2013.01)

(58) Field of Classification Search
CPC ...... H02N 2/186; H02N 2/181; H02K 7/1807; H02K 7/06; H02K 7/1853
See application file for complete search history.

(56) References Cited

U.S. PATENT DOCUMENTS 5,668,303 A * 9/1997 Giesler ................ G01N 29/022
73/61.79

OTHER PUBLICATIONS

Zhang, Jinhui et al., "Modeling of a Rope-Driven Piezoelectric Vibration Energy Harvester for Low-Frequency and Wideband Energy Harvesting", Micromachines 2021, 12, 305. https://doi.org/ 10.3390/mi12030305, 14 pages.
Chen, Li-Qun, "Analysis and Control of Transverse Vibrations of Axially Moving Strings" Applied Mechanics Reviews, Mar. 2005, vol. 58 / 91, 27 pages. Retrieved online from: https://www.researchgate. net/publication/216757266_Analysis_and_Control_of_Transverse_ Vibrations_of_Axially_Moving_Strings.
Zhou, Weipeng et al., "Recent Research Progress in Piezoelectric Vibration Energy Harvesting Technology", Energies 2022, 15, 947. https://doi.org/10.3390/en15030947, 35 pages. Retrieved online from: https://www.researchgate.net/publication/358186097_Recent_ Research_Progress_in_Piezoelectric_Vibration_Energy_Harvesting_ Technology.

* cited by examiner

*Primary Examiner* — Emily P Pham
(74) *Attorney, Agent, or Firm* — Jordan IP Law, LLC

(57) ABSTRACT

An energy harvesting system capable of using vibrational or mechanical energy to direct energy along a line to an energy receiver to transfer the vibrational energy. The energy harvesting system includes an energy transmitter capable of turning rotational or vibrational energy into a linear vibration that travels along the line to an energy receiver that takes the vibrational energy stored in the transverse wave and turns it into rotational motion. The rotational motion can then be used to drive an electric generator. A tension control unit provides tension to the line ensuring the amplitude of the transverse wave is at a maxima when it reaches the energy receiver.

20 Claims, 9 Drawing Sheets

100

100

100

WIRED VIBRATION ENERGY TRANSFER SYSTEM AND METHOD

TECHNICAL FIELD

The present disclosure relates to an energy harvesting system and, more particularly, using vibrational energy to direct energy along a line to a receiver to transfer energy.

BACKGROUND

The global energy crisis and environmental pollutions caused mainly by the increased consumption of nonrenewable energy sources has prompted researchers to explore alternative energy technologies that can harvest energies available in the ambient environment. Mechanical energy is the most ubiquitous ambient energy that can be captured and converted into useful electric power. Piezoelectric transduction is one of the prominent mechanical energy harvesting mechanisms. Thus, piezoelectric energy harvesting has received the utmost interest.

Advancements of micro and nanoscale materials and manufacturing processes have enabled the fabrication of piezoelectric generators with favorable features. Besides that, miniature devices with lesser power demand are realized in the market with technological developments in the electronics industry. Thus, it is anticipated that in the near future, many electronics will be powered by piezoelectric generators.

SUMMARY

In some embodiments, there is provided an energy harvesting system comprising: an energy transmitter to produce a vibration that travels in a transverse wave along a line; an energy receiver to receive vibrational energy stored in the transverse wave; and a tension control unit coupled to the energy transmitter, the tension control unit providing tension to the line such that an amplitude of the transverse wave is at a maxima when the transverse wave reaches the energy receiver.

In some embodiments, there is provided an energy harvesting system comprising: an energy transmitter to turn rotational energy into a vibration that travels along a line; a line attached to the energy transmitter where the energy transmitter creates a transverse wave that travels along the line; an energy receiver to receive the vibrational energy stored in the transverse wave and turn it into rotation; an electric generator that turns rotational energy into electricity; and a tension control unit coupled to the energy transmitter, the tension control unit providing tension to the line such that an amplitude of the transverse wave is at a maxima when the transverse wave reaches the energy receiver.

In some embodiments, there is provided an energy harvesting method, comprising: transmitting a vibration that travels in a transverse wave along a line; receiving vibrational energy stored in the transverse wave; and applying tension to the line such that an amplitude of the transverse wave is at a maxima when the transverse wave reaches an energy receiver.

DRAWINGS

The various advantages of the exemplary embodiments will become apparent to one skilled in the art by reading the following specification and appended claims, and by referencing the following drawings, in which:

Figure 3:
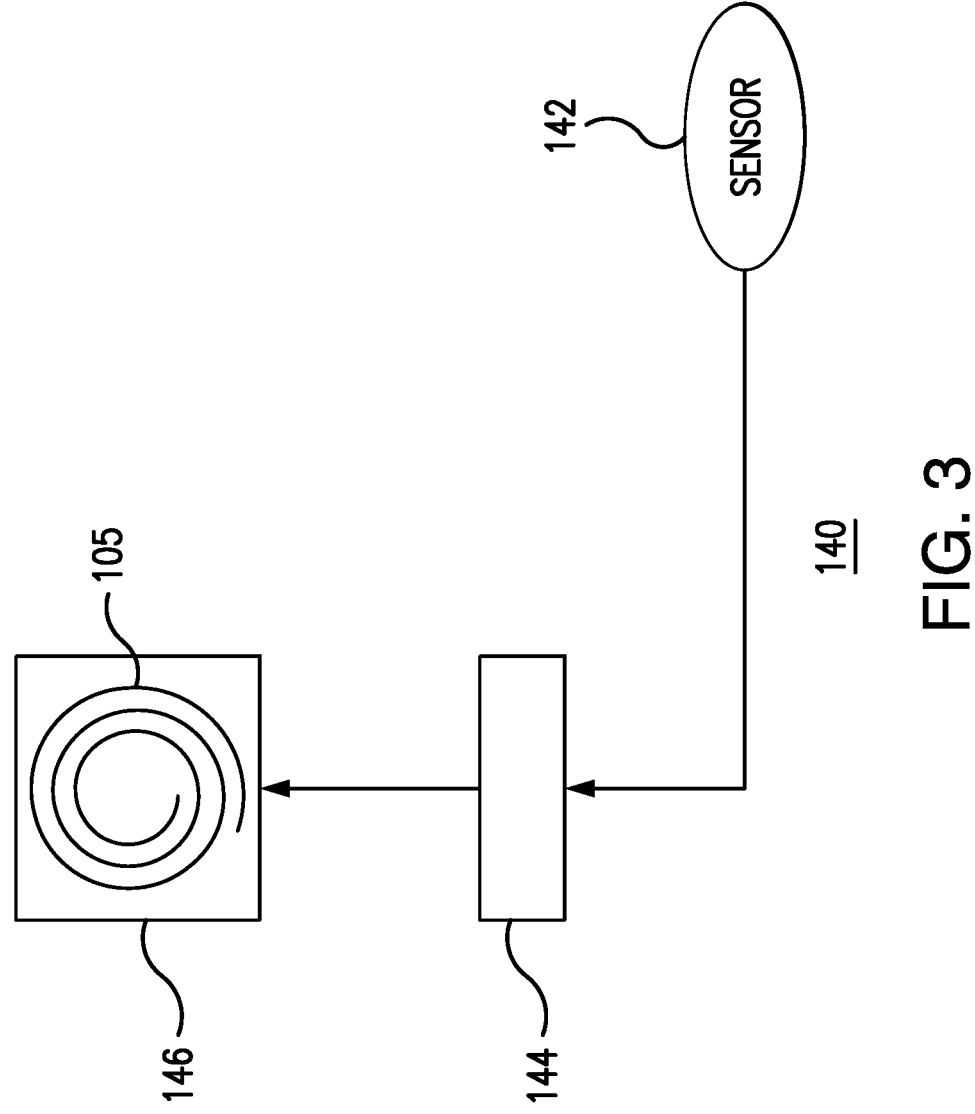

FIG. 3 illustrates a tension control unit 140 for use in controlling the tension in the line 105 of the energy harvesting system 100.

Figure 4:
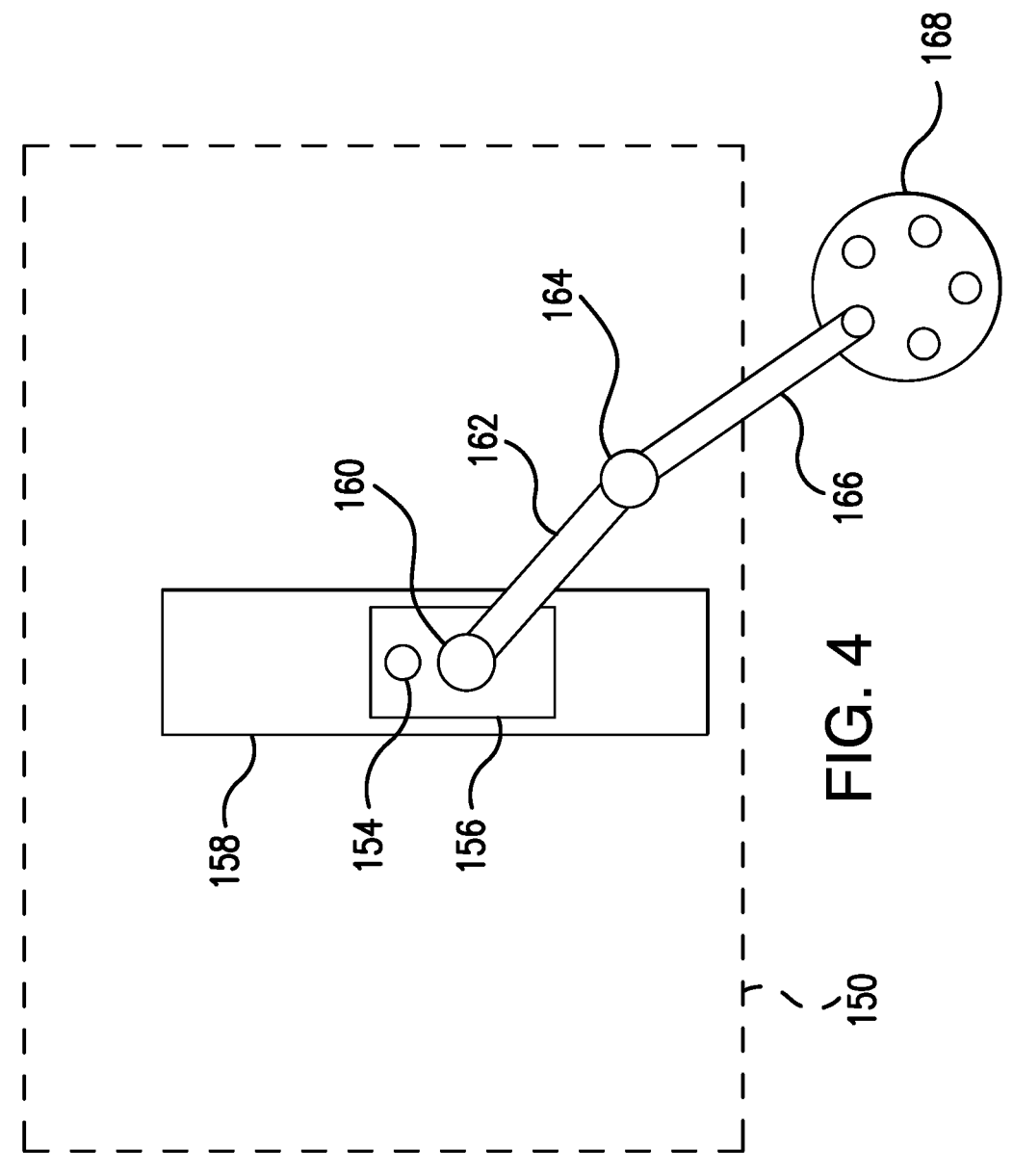

FIG. 4 illustrates a second converter 150 for use with a receiving unit.

Figure 1:
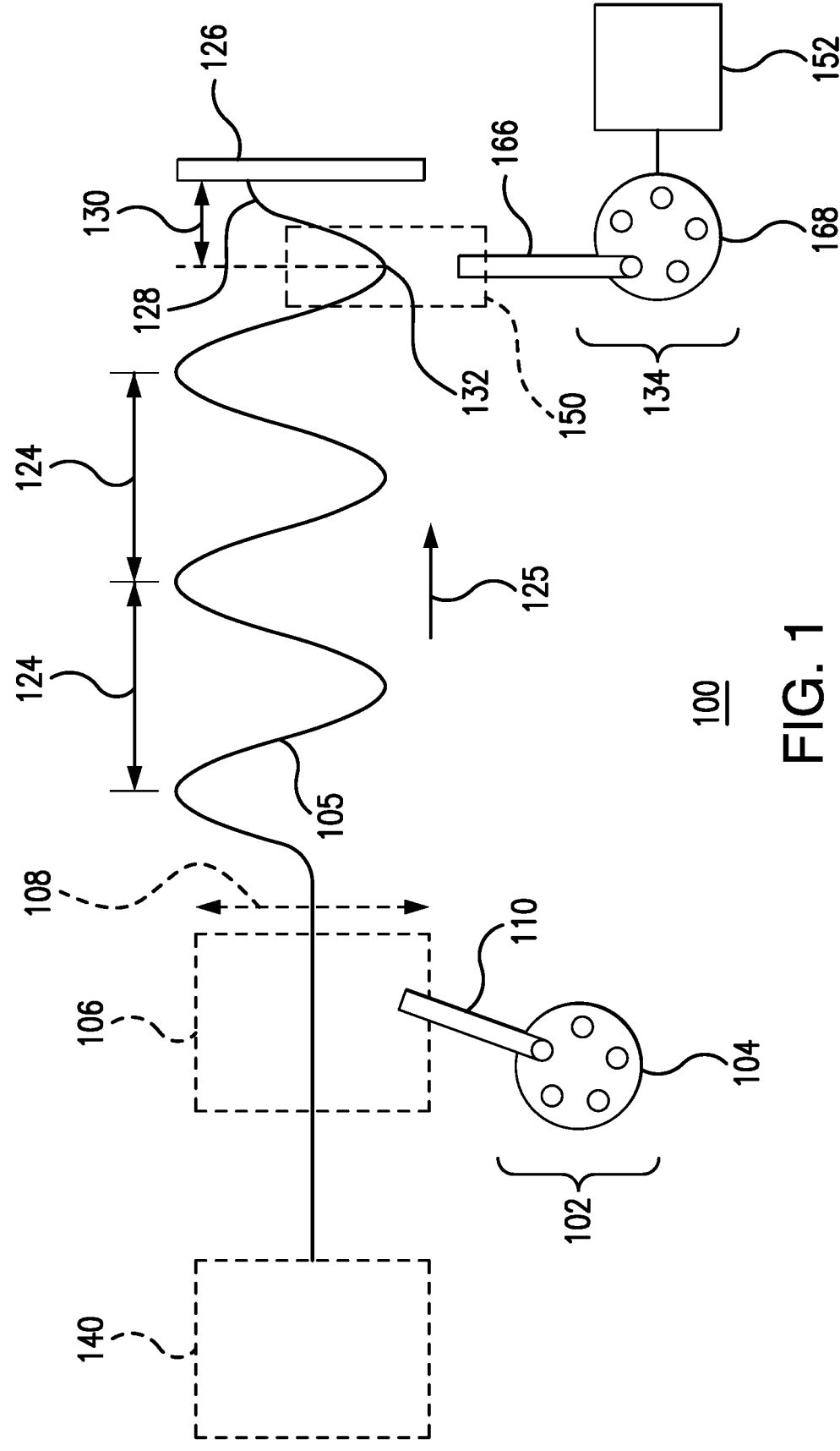
FIG. 1 illustrates a first embodiment of an energy harvesting system 100.
Figure 5:
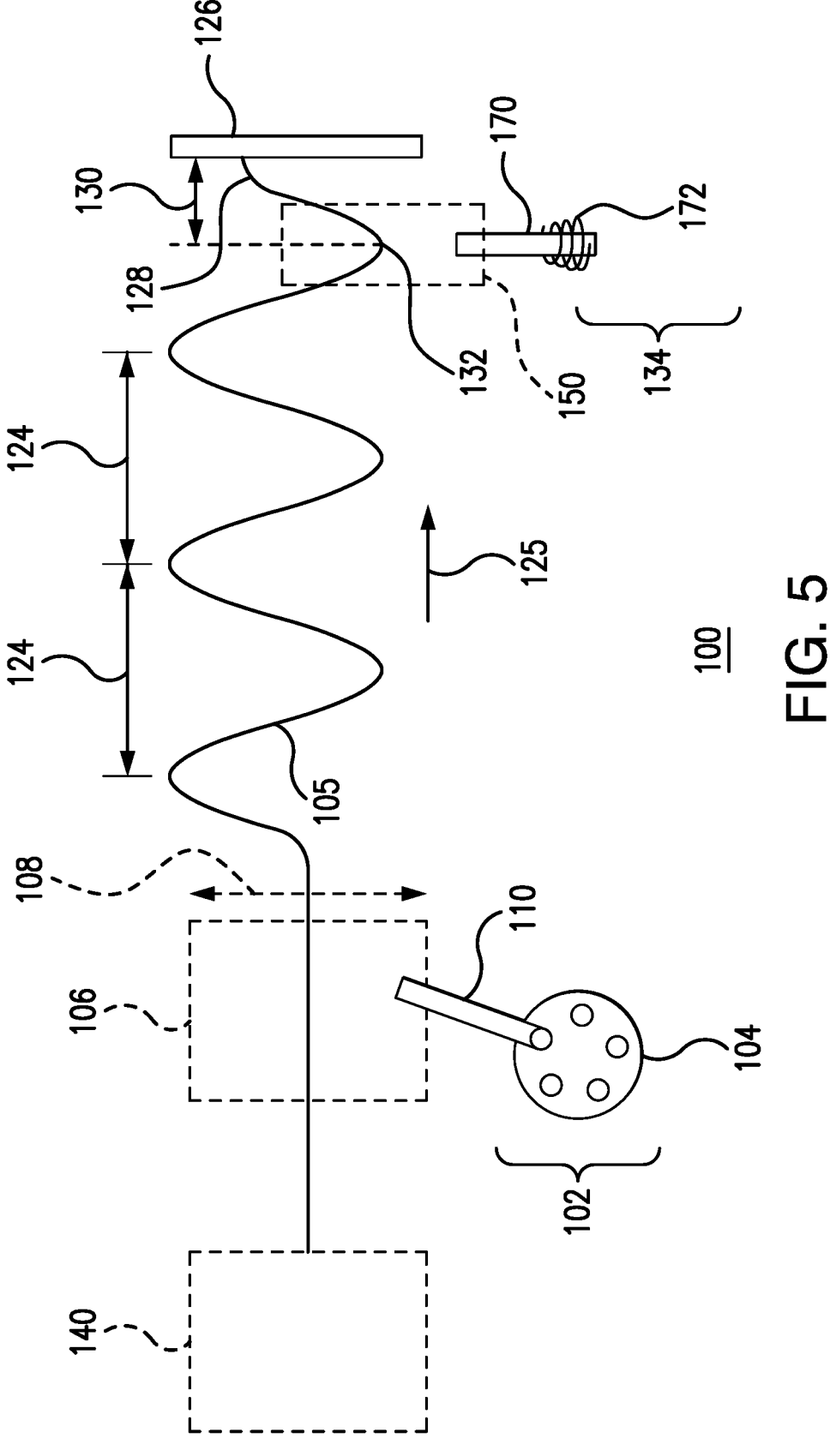

FIG. 5 illustrates a second embodiment of the energy harvesting system 100 of FIG. 1.

Figure 6:
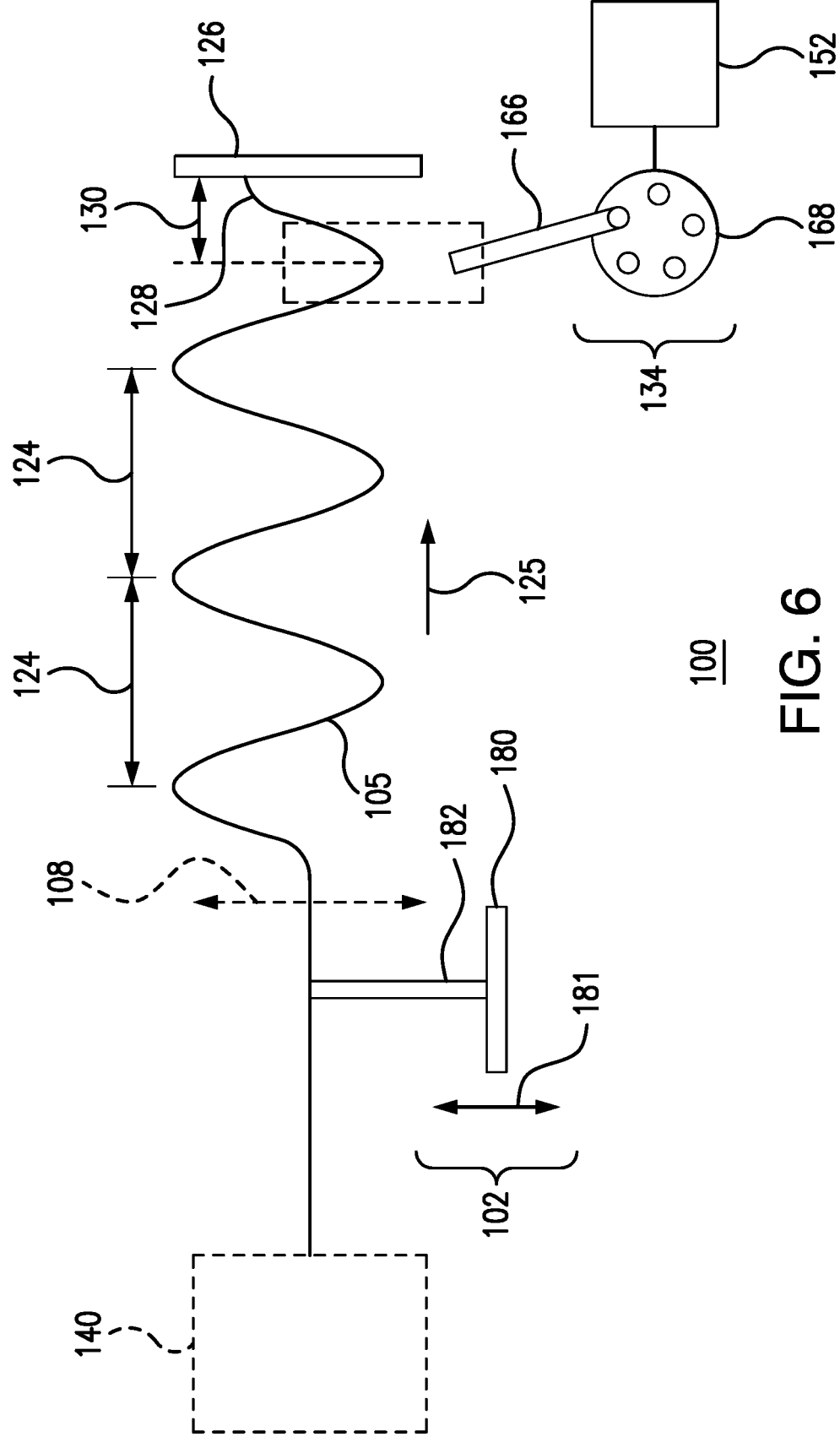

FIG. 6 illustrates a third embodiment of the energy harvesting system 100 of FIG. 1.

Figure 7:
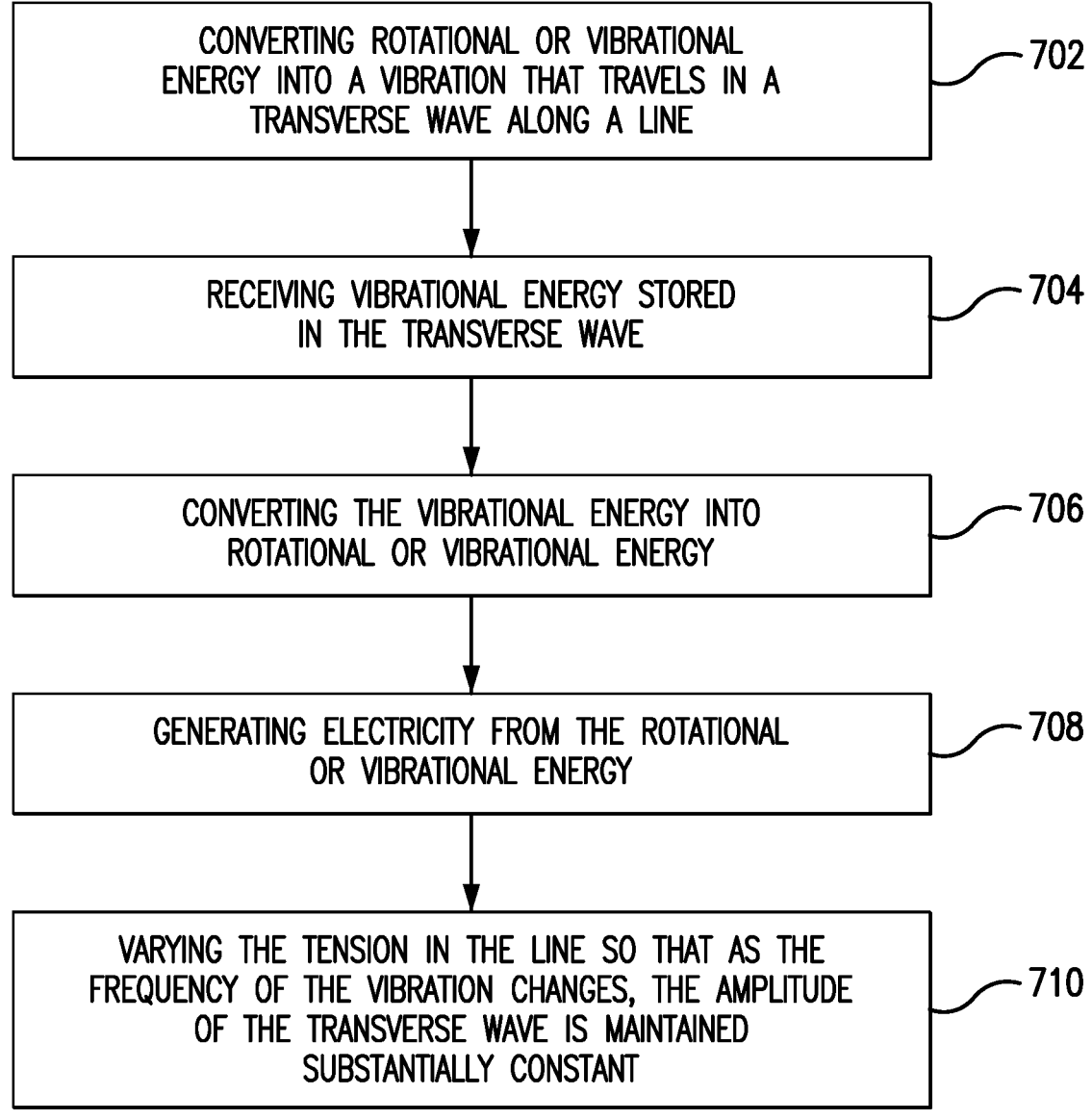

FIG. 7 illustrates a method of energy harvesting.

Figure 8:
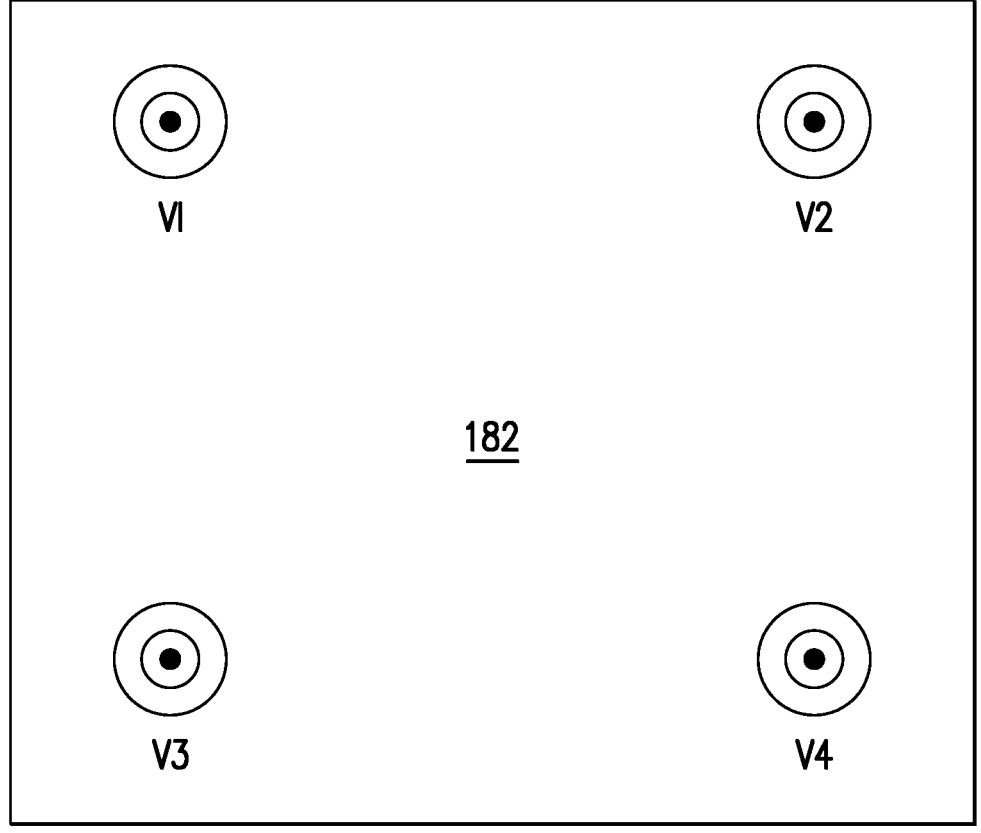

FIG. 8 illustrates a plurality of vibration sources V1-V4 on a mechanical plate 182.

Figure 9:
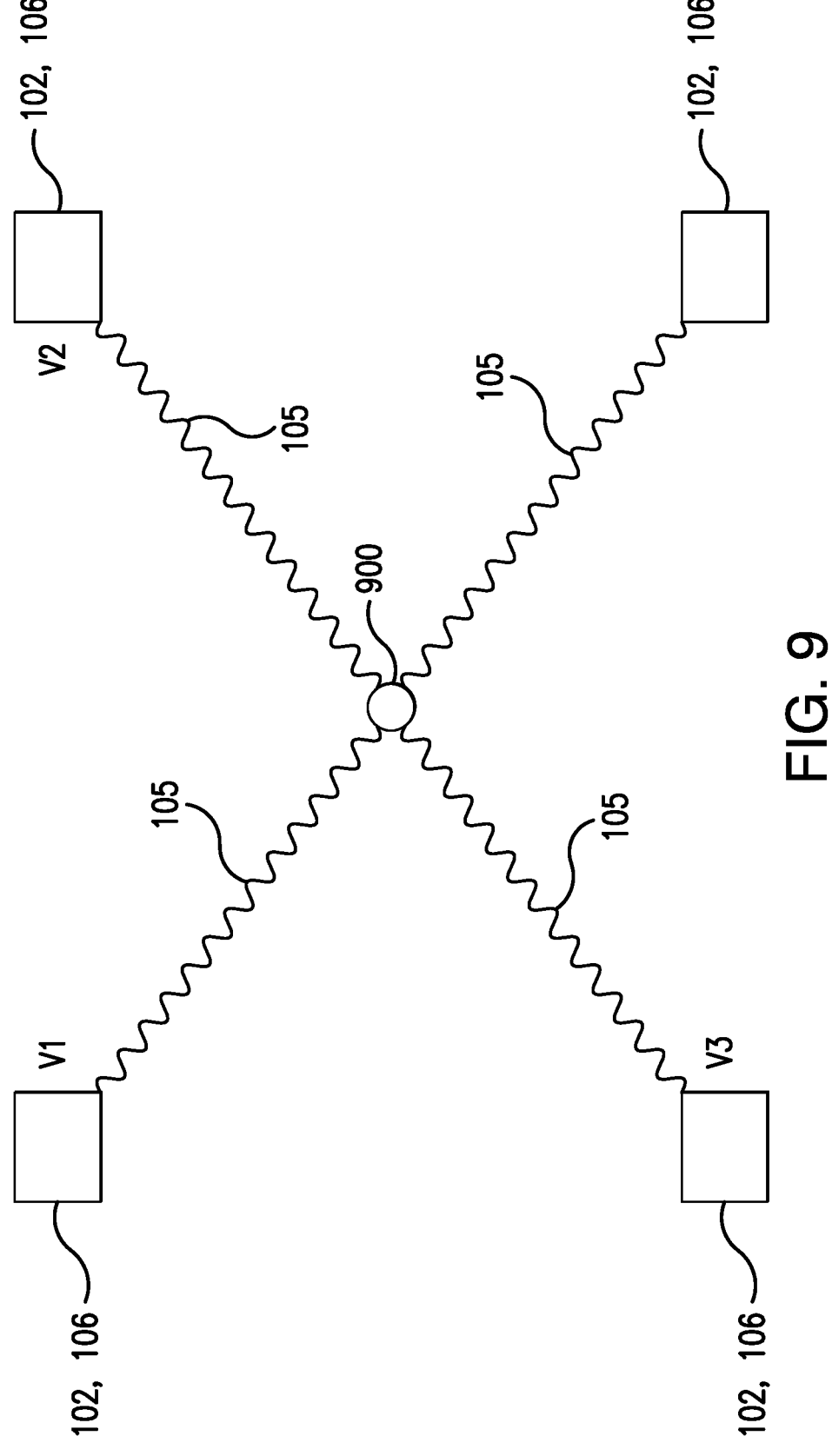

FIG. 9 illustrates the plurality of vibrations sources V1-V4 connected to a central energy receiver.

DESCRIPTION

Figure 2:
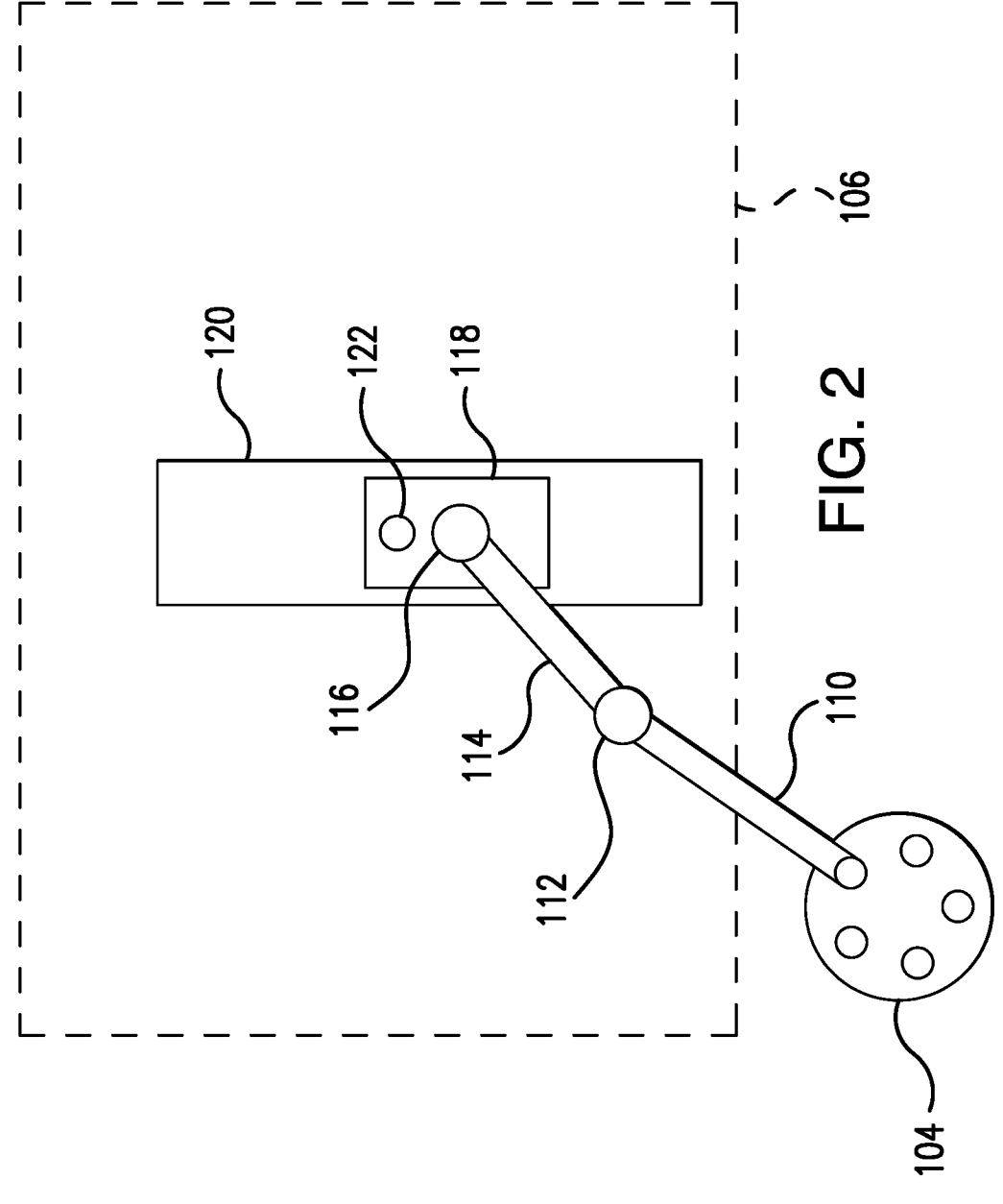
FIG. 2 illustrates the details of a first converter 106 for use with an energy transmitter.

FIG. 1 illustrates a first embodiment of an energy harvesting system 100. The system 100 can be used when an electrical signal is either undesirable or impossible because of electrical interference or otherwise. Energy transmitter 102 includes a disc (or first disc) 104 which is attached to equipment (not shown) that has a rotating piece to cause a transverse wave in line (e.g., a rope) 105. The equipment can be a variety of different types such as a motor or some other rotating type of machinery. The disc 104 can vary in size depending on a target amplitude of line 105. A larger disc produces a larger vibration and a smaller disc produces a smaller vibration. Disc 104 is attached to a converter (or first converter) 106 which turns the rotational motion (or rotational energy) of the disc 104 into a vibrational up and down motion as shown by arrow 108. Converter 106 could be one of a variety of different types of mechanisms for turning rotational motional (or rotational energy) into vertical motion. As shown in FIG. 2, first converter 106 is made up of a crank (first converter crank) 110, a first hinge pin (first converter first hinge pin) 112, a rod (first converter rod) 114, a second hinge pint (first converter second hinge pin) 116, a slider (first converter slider) 118, a channel (first converter channel) 120 and a line slide through piece (first converter line slide through piece) 122. Metal or plastic crank 110 is attached to disc 104 and to rod 114 through first hinge pin 112. The rod 114 is connected to slider 118 which as a result moves in an up and down motion in channel 120. As crank 110 travels in a rotational motion, it pushes and pulls rod 114 which drives the slider 118 up and down channel 120. Line 105 is threaded through line slide through piece 122 and moves up and down as line slide through piece 122 moves up and down the channel 120. In this manner, the rotational energy of energy transmitter 102 is turned into vibrational energy source to drive line 105. A transverse wave having wavelengths shown by reference 124 in direction 125 is created in line 105 as illustrated in FIG. 1. Line 105 is connected to a wall (or stationary piece) 126 by a line termination point (or line termination piece) 128. A predetermined distance 130 is set between the line termination point 128 and the point 132 at which the energy receiver attaches to the line 105. Predetermined distance 130 is equivalent to approximately one fourth of a wavelength 124 in the line 105. As predetermined distance 130 deviates from the quarter wavelength distance 130, efficiency will start to decrease. Operation of the energy receiver 134 will be discussed below in detail.

Tension control unit 140 is shown in FIG. 1 and, in detail, in FIG. 3. As illustrated in FIG. 3, the tension control unit 140 is made up of a sensor 142, microcontroller 144, and motorized pulley 146. Sensor 142 is coupled to microcontroller 144 having a processor and software which controls motorized pulley 146. The sensor 142 determines the frequency of oscillations of the line 105 and this frequency will determine how much tension (or force) is required for the system 100. Sensor 142 can be positioned on the line 105 or located on the vibration surface of the equipment and be in the form of an accelerometer. Alternatively, the sensor 142 can sense the rotational speed of the disc 104 and convert by a formula to determine the operational frequency of line 105. The sensor 142 will feed this information to microcontroller 144. Microcontroller 144 controls the mechanical motorized pulley 146 to adjust the amount of tension (or force) in the line 105. The pulley 146 either pulls the line in to decrease the length of the line 105 or slackens the line 105 to increase its length depending on the desired tension.

The tension control unit 140 is attached to the energy transmitter 102 through first converter 106 and provides tension (or "pretension" or "prestressed" since it is before the start of the transverse wave) to the line 105 ensuring the amplitude of the transverse wave is at a maxima when it reaches the energy receiver. The wavelength 124 of the transverse wave in line 105 is a function of the frequency of the vibration of the line 105. The tension control unit 140 maintains a substantially constant wavelength 124 during operation of the system 100 for different (or varying) frequencies. This is accomplished regardless of the frequency by ensuring that wavelengths 124 are controlled by adjusting the tension of the line 105. The tension control unit 140 basically maintains the wavelengths 124 and position of the largest vibration entry to the position and therefore there is no need to change the energy receiver 134 for different frequencies.

Returning to FIG. 1, energy receiver 134 harvests the vibrational energy produced by the first disc 104. Similar to operation of the first converter, a second converter 150 turns the vibrational energy from line 105 into a rotational energy to turn electric generator 152. This second converter 150 also could be a variety of different types of mechanisms for turning linear up and down movements into a rotational motion to drive generator 152 and produce electricity. As shown in FIG. 4, second converter 150 is made up of a line slide through piece (second converter line slide through piece) 154 traveling on a slide (second converter slide) 156 though a channel (second converter channel) 158, a first hinge pin (second converter first hinge pin) 160, a rod (second converter rod) 162, a second hinge pin (second converter second hinge pin) 164, and a crank (second converter crank) 166. Metal or plastic crank 166 is attached to second disc 168. The up and down motion of the line 105 drives the slider 156 up and down which drives rod 162 to move the crank 166 in a rotational manner. As crank 166 travels in a rotational motion, it turns disc 168 which drives generator 152 to produce electricity.

The energy harvesting system 100 can harvest microwatts for small applications and kilowatts for large applications.

FIG. 5 illustrates a second embodiment of the energy harvesting system 100 of FIG. 1. In this embodiment, the energy receiver 134 is made up of a vertical up and down plunger 170 moving in a linear direction attached to line 105 which has a magnet on one end which is driven in and out of a magnetic coil 172 to create electricity. In all other respects the second embodiment operates in the same manner as the first embodiment. A vibration source up and down is much easier to transfer the energy.

FIG. 6 illustrates a third embodiment of the energy harvesting system 100 of FIG. 1. In this embodiment, the energy transmitter 102 has a vibrational source 180 capable of moving up and down in a linear manner (as shown by arrow 181). Metal or plastic connector 182 connects the vibration source 180 to the line 105. In all other respects the second embodiment operates in the same manner as the first embodiment.

FIG. 7 illustrates a method of energy harvesting 700. In step 702, rotational or vibrational energy is converted in first converter 106 into a vibration that travels in a transverse wave along line 105. In step 704, second converter 150 receives the vibrational energy stored in the transverse wave and in step 706 the second converter 150 converts the vibrational energy into rotational or vibrational energy. In step 708, electricity is created by electric generator 152. In step 710, tension in the line 105 is varied so that as the frequency of the vibration of the line 105 changes, the location of the amplitude maxima of the transverse wave is maintained substantially constant. Step 710 will begin simultaneously with step 702 or shortly thereafter and occur either in parallel with steps 704-708 or after.

FIG. 8 illustrates a plurality of vibration sources V1, V2, V3 and V4 located on a mechanical plate 182. FIG. 9 shows the plurality of vibration sources V1-V4 each having an associated energy transmitter 102 connected to a central energy receiver 900 to transfer vibrational energy by lines 105. The plurality of energy transmitters 102 in this case would capture the up and down motion of the vibrations sources V1-V4. In this case, each of the 4 vibration sources and the central energy receiver 900 function similarly to the system 100 described above but the central energy receiver 900 would be able to collect energy from all 4 vibration sources V1-V4 substantially simultaneously at 4 energy receivers 134 and transfer this energy to a single generator 152. Alternatively, if the 4 lines 105 coming from each of the vibration sources V1-V4 were substantially synchronized, the central energy receiver 900 could be made up a single energy receiver 134 which is connected to generator 152.

Applications for the system 100 include miniaturized devices such as microelectromechanical systems (MEMS), underwater energy transport, and flying objects (e.g., a kite) tethered by a rope can deliver energy through the rope as described above.

Devices that are described as in "communication" with each other or "coupled" to each other need not be in direct physical contact, unless expressly specified otherwise. In addition, devices that are in communication with or coupled with each other may communicate directly or indirectly through one or more intermediaries.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An energy harvesting system comprising:
an energy transmitter to produce a vibration that travels in a transverse wave along a line;
an energy receiver to receive vibrational energy stored in the transverse wave; and
a tension control unit coupled to the energy transmitter, the tension control unit providing tension to the line such that an amplitude of the transverse wave is at a maxima when the transverse wave reaches the energy receiver.

2. The energy harvesting system of claim 1, wherein the energy transmitter is to convert rotational energy into the vibration that travels along the line.

3. The energy harvesting system of claim 1, wherein the energy transmitter is a vibrational source moving in a linear direction.

4. The energy harvesting system of claim 1, wherein the energy receiver is to convert the vibrational energy stored in the transverse wave into rotational energy.

5. The energy harvesting system of claim 4, further comprising:
an electric generator to convert the rotational energy into electricity.

6. The energy harvesting system of claim 2, further comprising:
a first converter provided between the energy transmitter and the line, the first converter configured to convert the rotational energy into the vibration.

7. The energy harvesting system of claim 6, further comprising:
a second converter provided between the line and the energy receiver, the second converter configured to convert the vibrational energy into the rotational energy.

8. The energy harvesting system of claim 1, wherein the tension control unit comprises:
a sensor to sense a frequency of oscillations of the line; and
a microcontroller coupled to the sensor and a motorized pulley, wherein the microcontroller determines the frequency of the oscillations of the line and controls an amount of force to either increase a length of the line or decrease the length of the line in the motorized pulley.

9. The energy harvesting system of claim 1, wherein the line comprises a rope.

10. The energy harvesting system of claim 1, wherein the energy receiver further comprises:
a magnet driven by the vibrational energy through a magnetic coil to produce electricity.

11. An energy harvesting system comprising:
an energy transmitter to turn rotational energy into a vibration that travels along a line;
a line attached to the energy transmitter where the energy transmitter creates a transverse wave that travels along the line;
an energy receiver to receive vibrational energy stored in the transverse wave and turn it into rotation;

an electric generator that turns rotational energy into electricity; and
a tension control unit coupled to the energy transmitter, the tension control unit providing tension to the line such that an amplitude of the transverse wave is at a maxima when the transverse wave reaches the energy receiver.

12. The energy harvesting system of claim 11, further comprising:
a first converter provided between the energy transmitter and the line, the first converter configured to convert the rotational energy into the vibration; and
a second converter located between the line and the energy receiver, the second converter configured to convert the vibrational energy into rotational energy.

13. The energy harvesting system of claim 11, wherein the tension control unit comprises:
a sensor to sense a frequency of oscillations of the line; and
a microcontroller coupled to the sensor and a motorized pulley, wherein the microcontroller determines the frequency of the oscillations of the line and controls an amount of force to either increase a length of the line or decrease the length of the line in the motorized pulley.

14. The energy harvesting system of claim 11, wherein the line comprises a rope.

15. An energy harvesting method, comprising:
transmitting a vibration that travels in a transverse wave along a line;
receiving vibrational energy stored in the transverse wave; and
applying tension to the line such that an amplitude of the transverse wave is at a maxima when the transverse wave reaches an energy receiver.

16. The energy harvesting method of claim 15, further comprising:
converting rotational energy into the vibration that travels along the line.

17. The energy harvesting method of claim 15, further comprising:
creating the vibration from a vibrational source moving in a linear direction.

18. The energy harvesting method of claim 15, further comprising:
varying the tension in the line so that as a frequency of the vibration changes, a location of an amplitude maxima of the transverse wave is substantially constant.

19. The energy harvesting method of claim 15, further comprising:
converting the vibrational energy into rotational energy; and
converting the rotational energy into electricity.

20. The energy harvesting method of claim 16, further comprising:
sensing using a sensor a frequency of oscillations of the line;
determining frequency of the oscillations of the line using a microcontroller coupled to the sensor; and
controlling an amount of force to either increase a length of the line or decrease the length of the line using a motorized pulley.

* * * * *